Patented Sept. 3, 1935

2,013,063

UNITED STATES PATENT OFFICE 2,013,063

METHOD FOR THE PROTECTION OF PLANTS FROM DESICCATION

Elroy J. Miller, East Lansing, Mich., assignor to The Michigan State Board of Agriculture, East Lansing, Mich.

No Drawing. Application July 26, 1933, Serial No. 682,274

3 Claims. (Cl. 47—58)

The invention relates to a composition of matter comprising a wax, the ammonium salt of a drying acid, and a colloidal earth. The foregoing ingredients are to be incorporated in an aqueous emulsion which is suitable for protecting nursery stock against mold and desiccation while in storage, and from windburn and moisture loss during the period after planting until the root system is well established. The composition may also be used in the treatment of cut flowers to prolong the life thereof.

It is therefore an object of the invention to provide a composition which can be diluted with water to a concentration desirable for use, and which will then remain in a well-emulsified form during a sufficient period of time for application. It is also an object to provide a wax emulsion composition which will have application over a relatively wide range of temperature without cracking or melting, and which will have the general favorable qualities of being adherent, smooth, tough, pliable and permeable.

The invention then consists of the combination of ingredients hereinafter fully described and particularly pointed out in the claims.

The wax which I prefer to use is paraffin wax, but others such as beeswax, carnauba, etc. can be employed. The ammonium salts of any of the drying acids, i. e. unsaturated fatty acids having two or more double bonds in their chemical formula such as those derived from drying oils: linseed, sardine, perilla, tung, lumbang, soya bean, fish, etc. can be used. The preferable colloidal earth is bentonite, but fuller's earth, or similar diatomaceous clays, can be employed. For certain uses of the composition I have found it advantageous to incorporate therewith an insecticide, fungicide, germicide, or preservative, such as an arsenical, lime sulphur, or various well-known organic compounds having insecticidal properties.

One method by which my composition can be prepared is as follows: dissolve the ammonium salt of a drying acid in hot water, separately suspend a colloidal earth in hot water, then mix the solution and suspension, and thereupon add molten wax to the mixture when the latter is at a temperature above the melting point of the wax, with constant stirring. After a good emulsion is obtained, allow the mixture to cool with continuous agitation.

A great many combinations of the ingredients set forth were prepared and tested. It was found that a very satisfactory emulsion to be used as a spray was obtained with a concentrate containing by weight about 10 parts of wax, 3 parts of the ammonium salt of a drying acid, 3 parts of a colloidal earth, and 20 parts of water, when diluted with 80 parts of water. An excellent grafting compound is prepared by compounding 6 parts by weight of paraffin wax, 4 parts of beeswax, 3 parts of the ammonium salt of a drying acid, 3 parts of a colloidal earth, and 10 to 15 parts of water. I have found that the proportions of the constituents in the emulsion can be varied between fairly wide limits, depending upon the particular physical properties, e. g. whether solid or liquid, desired in the composition.

*Example.*—3 parts by weight of ammonium linoleate were dissolved in 50 parts of hot water. 3 parts of bentonite were worked into a smooth suspension with 50 parts of hot water, and added to the above solution. While the mixture was still at a temperature above the melting point of paraffin, 10 parts of molten paraffin was slowly poured thereinto with vigorous stirring until a good emulsion was obtained. The emulsion was then allowed to cool to air temperature while continuing the rapid stirring.

The function of the bentonite in the emulsion is to form a frame or lattice for the support of the wax to prevent its flowing away in melted form during exceptionally hot weather, to prevent tissue injury by providing a semi-permeable film through which the vapors and gases necessary for transpiration of the nursery stock may pass, and particularly to control the loss of water from the plant or tree sufficiently to prevent desiccation.

The emulsifying agent must dry rapidly after application of the emulsion to nursery stock, and I have found it necessary to use the ammonium salts of drying acids, i. e. unsaturated fatty acids having two or more double bonds in their chemical formula, such as are derived from the drying oils, in the preparation of my composition, since salts of acids of the oleic acid series, i. e. unsaturated fatty acids having only one double bond in their chemical formula, will not dry after the composition has been sprayed onto stock. It will be understood that "drying" means the oxidation of the acid, thereby forming a tough, pliable film, in a manner similar to that in which oils in paints "dry" to form a film. Salts of acids of the oleic acid series do not dry, but remain in a somewhat greasy state, which is highly undesirable, and moreover, such salts actually have a detrimental effect on the foliage of nursery stock. Also, the alkali metal salts of drying acids remain soluble in water for extended periods of time, whereas in the case of the ammonium salts the ammonia evaporates, leaving an insoluble residue.

This application is a continuation-in-part of my prior application, Serial Number 636,940, filed 8 October 1932.

Other modes of applying the principle of my invention may be employed instead of those explained, change being made as regards the materials employed, provided the ingredients stated by any of the following claims or the equivalent of such stated ingredients be employed.

I therefore particularly point out and distinctly claim as my invention:—

1. The method for protecting plants, nursery stock, and the like, against desiccation which comprises spraying the same with an aqueous wax emulsion containing a colloidal earth whereby a permeable film is formed thereon.

2. In a method for the protection of plants, nursery stock, and the like, from desiccation during storage or the period after planting until the root system is well established, the step which consists in spraying the same with an aqueous emulsion comprising wax, an ammonium salt of a drying acid, and a colloidal earth.

3. In a method for the protection of plants, nursery stock, and the like, from desiccation during storage or the period after planting until the root system is well established, the step which consists in spraying the same with an aqueous emulsion comprising wax, ammonium linoleate, and bentonite.

ELROY J. MILLER.